US009755988B2

(12) United States Patent
Arnette et al.

(10) Patent No.: US 9,755,988 B2
(45) Date of Patent: *Sep. 5, 2017

(54) METHOD AND SYSTEM FOR ARBITRAGING COMPUTER RESOURCES IN A CLOUD COMPUTING ENVIRONMENT

(71) Applicant: Sonian Inc., Dedham, MA (US)

(72) Inventors: Gregory L. Arnette, Truro, MA (US); Timothy Dysinger, Kapaa, HI (US)

(73) Assignee: Sonian, Inc., Waltham, MA (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/338,808

(22) Filed: Jul. 23, 2014

(65) Prior Publication Data

US 2014/0337532 A1 Nov. 13, 2014

Related U.S. Application Data

(63) Continuation of application No. 13/149,141, filed on May 31, 2011.

(60) Provisional application No. 61/349,877, filed on May 30, 2010.

(51) Int. Cl.
*H04L 12/911* (2013.01)
*G06F 9/48* (2006.01)
*G06Q 10/06* (2012.01)

(52) U.S. Cl.
CPC ............ *H04L 47/70* (2013.01); *G06F 9/4881* (2013.01); *G06Q 10/06311* (2013.01); *G06Q 10/063114* (2013.01)

(58) Field of Classification Search
USPC ...................................... 705/7.11, 7.13, 7.23
See application file for complete search history.

(56) References Cited

U.S. PATENT DOCUMENTS

| 6,038,540 A | 3/2000 | Krist et al. |
| 6,332,163 B1 | 12/2001 | Bowman-Amuah |
| 6,400,996 B1 | 6/2002 | Hoffberg et al. |
| 6,519,574 B1 | 2/2003 | Wilton et al. |
| 6,745,156 B2 | 6/2004 | Cook |
| 6,785,592 B1 | 8/2004 | Smith et al. |
| 7,024,383 B1 | 4/2006 | Manchini et al. |

(Continued)

FOREIGN PATENT DOCUMENTS

| CN | 101685527 A | 3/2010 |
| EP | 1335572 A2 | 8/2003 |

(Continued)

OTHER PUBLICATIONS

International Search Report and Written Opinion, PCT Application No. PCT/US11/38590, dated Oct. 27, 2011, 6 pages.

*Primary Examiner* — Mark A Fleischer
(74) *Attorney, Agent, or Firm* — Cesari and McKenna, LLP

(57) ABSTRACT

Disclosed are methods and systems for processing a workload among a plurality of computing resources that optimizes the processing price per workload. The method includes breaking the workload into two or more tasks each having a size optimized based on (i) a price history of one or more of the plurality of computing resources and (ii) a predicted duration to complete processing of each of the respective tasks; and sending one of the two or more tasks to a computing resources for which the size of the tasks is optimized.

19 Claims, 6 Drawing Sheets

(56) References Cited

U.S. PATENT DOCUMENTS

| | | |
|---|---|---|
| 7,031,778 B2 | 4/2006 | Hsiung et al. |
| 7,401,057 B2 | 7/2008 | Eder |
| 7,472,084 B2 | 12/2008 | Damschroder |
| 7,574,496 B2 | 8/2009 | McCrory et al. |
| 7,636,764 B1 | 12/2009 | Fein et al. |
| 7,680,725 B2 | 3/2010 | Bloom et al. |
| 7,707,091 B1 | 4/2010 | Kauffman et al. |
| 7,720,968 B2 | 5/2010 | Clarke et al. |
| 7,870,044 B2 | 1/2011 | Robertson |
| 7,886,038 B2 | 2/2011 | Ferris |
| 7,890,549 B2 | 2/2011 | Elad et al. |
| 7,925,565 B2 | 4/2011 | Torre et al. |
| 7,925,708 B2 | 4/2011 | Davis et al. |
| 7,930,050 B2 | 4/2011 | Wertheimer |
| 7,937,329 B1 | 5/2011 | Cooperstone et al. |
| 8,276,143 B2 * | 9/2012 | Vengerov ............... G06F 9/5083 718/102 |
| 2001/0023414 A1 | 9/2001 | Kumar et al. |
| 2002/0120486 A1 | 8/2002 | Thompson |
| 2002/0194113 A1 | 12/2002 | Lof et al. |
| 2004/0267676 A1 | 12/2004 | Feng et al. |
| 2006/0230149 A1 | 10/2006 | Jackson |
| 2007/0087756 A1 | 4/2007 | Hoffberg |
| 2008/0103903 A1 | 5/2008 | Flake et al. |
| 2008/0281676 A1 | 11/2008 | Stahura et al. |
| 2009/0106140 A1 | 4/2009 | De La Motte |
| 2009/0178047 A1 * | 7/2009 | Astley ................... H04L 47/822 718/104 |
| 2009/0204470 A1 * | 8/2009 | Weyl ...................... G06Q 10/06 705/7.13 |
| 2009/0216910 A1 | 8/2009 | Duchesneau |
| 2009/0259534 A1 | 10/2009 | Utter et al. |
| 2009/0276771 A1 * | 11/2009 | Nickolov .............. G06F 9/4856 717/177 |
| 2009/0327493 A1 | 12/2009 | Gauthier et al. |
| 2010/0030866 A1 | 2/2010 | Bedi |
| 2010/0061250 A1 | 3/2010 | Nugent |
| 2010/0076856 A1 | 3/2010 | Mullins |
| 2010/0131383 A1 | 5/2010 | Raghavan |
| 2100/0125473 | 5/2010 | Tung et al. |
| 2010/0153955 A1 | 6/2010 | Sirota et al. |
| 2010/0191612 A1 | 7/2010 | Raleigh |
| 2010/0211958 A1 | 8/2010 | Madison et al. |
| 2010/0235355 A1 | 9/2010 | Carter et al. |
| 2010/0268632 A1 | 10/2010 | Rosenthal |
| 2010/0287280 A1 | 11/2010 | Sivan |
| 2010/0293050 A1 | 11/2010 | Maher et al. |
| 2010/0299313 A1 | 11/2010 | Orsini et al. |
| 2010/0325191 A1 | 12/2010 | Jung et al. |
| 2011/0072489 A1 | 3/2011 | Parann-Nissany |
| 2011/0191781 A1 * | 8/2011 | Karanam ................. G06F 9/50 718/104 |
| 2011/0213712 A1 * | 9/2011 | Hadar .................... G06Q 30/04 705/80 |

FOREIGN PATENT DOCUMENTS

| | | |
|---|---|---|
| JP | 2004-213642 A | 7/2004 |
| JP | 2009-151725 A | 7/2009 |
| JP | 2009-277242 A | 11/2009 |
| WO | WO-2006/029297 A2 | 3/2006 |
| WO | WO-2006/038034 A2 | 4/2006 |
| WO | WO-2007/032003 A2 | 3/2007 |
| WO | WO-2009/143084 A1 | 11/2009 |
| WO | WO-2010/058989 A1 | 5/2010 |
| WO | WO-2010/088095 A1 | 8/2010 |
| WO | WO-2010/120441 A2 | 10/2010 |
| WO | WO-2011/041101 A1 | 4/2011 |

* cited by examiner

METHOD AND SYSTEM FOR ARBITRAGING COMPUTER RESOURCES IN A CLOUD COMPUTING ENVIRONMENT

CROSS-REFERENCE TO RELATED APPLICATIONS

This application is a continuation of commonly assigned copending U.S. patent application Ser. No. 13/149,141, which was filed on May 31, 2011, by Arnette et al. for a "Method and System for Arbitraging Computing Resources In A Cloud Computing Environment" and claims priority to and the benefit of U.S. Provisional Patent Application Ser. No. 61/349,877, filed on May 29, 2010, entitled. "Method and System for Arbitraging Computing Resources In A Cloud Computing Environment," and which to is hereby incorporated by reference in its entirety.

BACKGROUND OF THE INVENTION

Field of the Invention

The invention relates to data processing. In particular, systems and methods consistent with the present invention relate to allocation of resources in a cloud computing environment.

Background Information

"Cloud computing" refers to the access of computing resources and data via a network infrastructure, such as the Internet. The computing resources and data storage may be provided by linked data centers of the "cloud," i.e., network. Each of the data centers may include a plurality of servers that provide computing resources, as well as data storage and retrieval capabilities. Users of cloud computing generally do not need knowledge regarding or control over the underlying data center infrastructure of the "cloud". Rather, the users may purchase, subscribe, or lease the computing resources and data storage capabilities on an as-needed and 'pay as you go' basis.

When a user requests access to the computing resources, the user may request access based on a set of service level requirements, and a pricing agent managing access to the computing resources will provide a price to service the user's request. Some systems allow a user to provide a bid with a request. The bid being a suggested price that the user will pay for the purchase, subscription, or lease of the computing resources. In such a system, the pricing agent managing access to the computing resources will accept the bid or reject the bid. Upon rejection of the bid, the user can submit another bid or the pricing agent may submit a counter-bid.

Whether a pricing agent will accept the user's bid may change throughout the day or relevant time cycle. Typically, the value of an accepted bid increases during peak demand, and decreases when there is slack in the demand for the computing resources. Demand for the computing resource at different data centers will also vary at any given point in time. This means that at any given time $T_1$, the accepted bid at datacenter Alpha, $P_A$, and the accepted bid at data center Beta, $P_B$, may differ by some value $\Delta_P$. Although described with reference to two data centers, the example would be the same if one data center offered two different service levels, A and B.

Another characteristic of cloud computing is that the pricing may be static or dynamic. In a static pricing model, the computing resources are available for the contract period and accepted bid price. In a dynamic pricing model, the computing resources are available only so long as the pricing agent does not receive a higher competing bid. Thus, in a dynamic pricing model, a user may lose a computing resource mid-processing cycle if a higher bidder requests access. Upon losing the computing resource, the user may either increase his bid or lengthen his processing term to increase the likelihood that demand will drop and his will become the highest bid.

Another problem with operating under a dynamic pricing model is that it is difficult for a user to select among available (typically competing) data centers, each offering computing resources. The average user typically does not have the information necessary to predict how demand, and therefore price, will change over time for each data center's computing resources. For example, while data center Alpha may accept an lower bid, initially, than data center Beta, over a time cycle (e.g., a day), data center B may be cheaper because a large, cost insensitive, consumer of computing resources typically demands data center Alpha's computing resources for 40% of each time cycle.

Thus, there is a need for a tool the allow users to manage their costs and time horizons when using computing resources offered on a dynamic pricing model.

BRIEF SUMMARY OF THE INVENTION

The invention is a method and system for arbitraging computing resources in a cloud computing environment. An objective of the present invention is to find the most economical time to schedule processes in a cloud computing environment. Another objective of the present invention is to determine the optimal time frame for processing data in a cloud computing environment.

The present disclosure is directed to implementations of a method and system for arbitraging computing resources in a cloud computing environment. More specifically, the present invention is directed at using historical pricing and processing data produced from a cloud computing environment to calculate optimal bid pricing and processing times. According to first exemplary embodiment of the invention, there is provided a method for processing a workload among a plurality of computing resources. The method includes breaking the workload into two or more tasks each having a size optimized based on (i) a price history of one or more of the plurality of computing resources and (ii) a predicted duration to complete processing of each of the respective tasks; and sending one of the two or more tasks to computing resources for which the size of the tasks is optimized.

In one aspect of this first exemplary embodiment, the method further includes purchasing compute time from the computing resource to which the task is sent.

In another aspect of this first exemplary embodiment, the method further includes selecting a price history based on a stored profile associated with a user.

In another aspect of this first exemplary embodiment, the stored profile is also associated with one of the plurality of computing resources.

In another aspect of this first exemplary embodiment, the method further includes selecting a price history based on a stored profile associated with a second user different from a first user that requests processing of the workload.

In another aspect of this first exemplary embodiment, the method further includes collecting information related to processing of the workload; and modifying the stored profile based on the collected information.

In another aspect of this first exemplary embodiment, the stored profile has associated with it attributes, the attributes comprising one or more of: average work load size, average historical processing time, price fluctuations, type of information processed, and combinations thereof.

In another aspect of this first exemplary embodiment, the method further includes, receiving a bid and a designated duration: and providing the user an indication of the probability that the workload will be processed at the bid price and within the designated duration.

In another aspect of this first exemplary embodiment, the method further includes calculating the probability according to the function:

$$P(A) = \frac{n(A)}{n(S)}$$

where n(A) is occurrences of workloads completing during the designated duration, and n(S) is the sum of the occurrences of workloads completing during the designated duration and the occurrences of workloads failing to complete during the designated duration.

According to a second exemplary embodiment of the invention, there is provided a system for processing a workload among a plurality of computing resources. The system includes, a workload packaging module that breaks the workload into two or more tasks each having a size optimized based on (i) a price history of one or more of the plurality of computing resources and (ii) a predicted duration to complete processing of each of the respective tasks; and a workload scheduling module that queues the tasks having the optimized size for the computing resources.

In an aspect of this second exemplary embodiment, the system further includes a workload buying module that purchases compute time from the computing resources for which a task is queued.

In another aspect of this second exemplary embodiment, the workload packaging module selects a price history based on a stored profile associated with a user.

In another aspect of this second exemplary embodiment, the stored profile is also associated with one of the plurality of computing resources.

In another aspect of this second exemplary embodiment, the workload packaging module selecting a price history based on a stored profile associated with another user different from the user.

In another aspect of this second exemplary embodiment, the workload packaging module, collects information related to processing of the workload; and modifies the stored profile based on the collected information.

In another aspect of this second exemplary embodiment, the stored profile has associated with it attributes, the attributes comprising one or more of: average work load size, average historical processing time, price fluctuations, type of information processed, and combinations thereof.

In another aspect of this second exemplary embodiment, the system further includes a probability calculator that receives a bid and a designated duration, and provides a user an indication of the probability that the workload will be processed at the bid price and within the designated duration.

In another aspect of this second exemplary embodiment, the probability calculator calculates the probability according to the function:

$$P(A) = \frac{n(A)}{n(S)}$$

where n(A) is occurrences of workloads completing during the designated duration, and n(S) is the sum of the occurrences of workloads completing during the designated duration and the occurrences of workloads failing to complete during the designated duration.

In another aspect of this second exemplary embodiment, the system further includes a workload status monitoring module that monitors the status of tasks executing at the plurality of computing resources.

In another aspect of this second exemplary embodiment, the system further includes the workload status monitoring module stopping the execution of a task, and moving the task to a different computing resource.

In another aspect of the second exemplary embodiment, modifying the stored profile based on the collected information comprises updating the stored profile with data gathered during processing of the user's workload.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

The terms "user" and "consumer" are used interchangeably throughout the detailed description.

Figure 1:
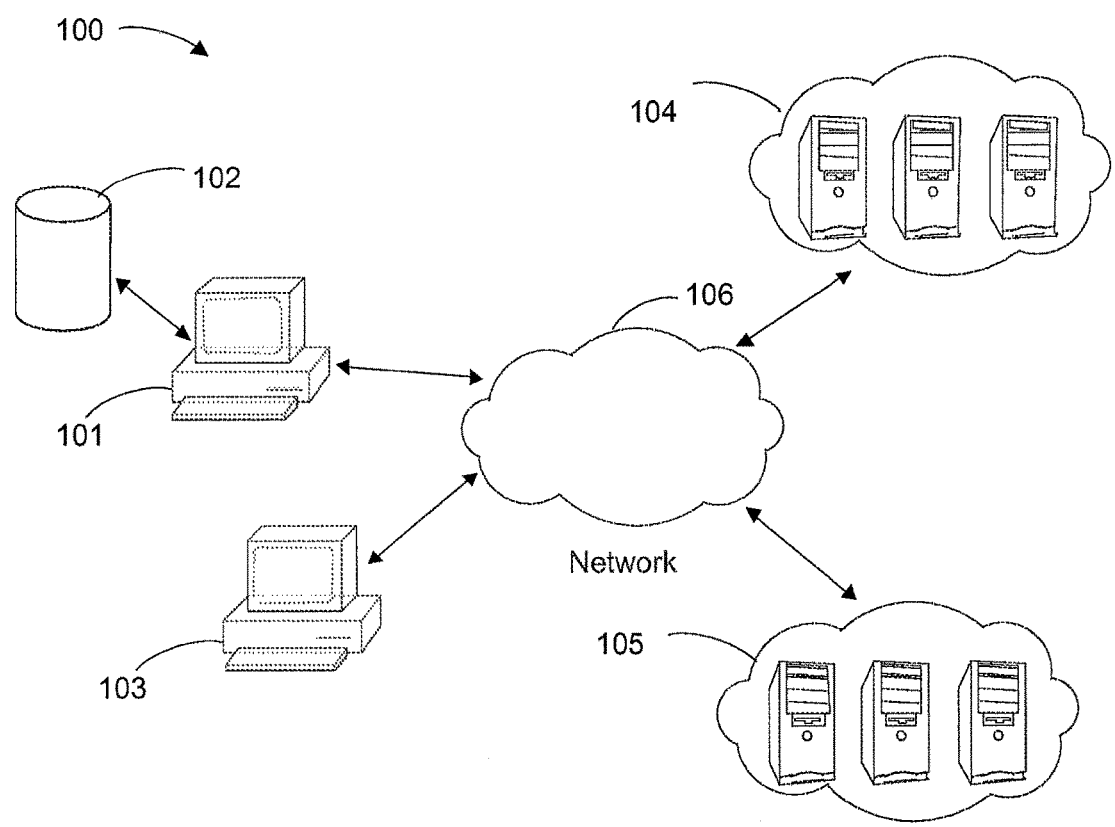
FIG. 1 is a functional block diagram of a system for arbitraging computer resources in a cloud computing environment in accordance with an illustrative embodiment of the present invention.

FIG. 1 illustrates an exemplar system for arbitraging computer resources in a cloud computing environment 100. The exemplar system 100 includes a computer 103 a computing arbitrage server 101, a plurality of cloud computing environments 104, 105, and a network 106. The computing arbitrage server 101 may generate and/or populate a database 102 through the network 106, as described in further detail herein. Although the database 102 is illustrated external to the computing arbitrage server 101, it is contemplated that the database 102 may be an integral component of the computing arbitrage server 101, and/or be resident in a separate memory, or an electronic storage medium (e.g. server) that communicates with the computing arbitrage server 101. The computing arbitrage server 101 may communicate with the computer 103 and/or a plurality of cloud computing environments 104, 105 through the network 106. The network 106 may include, but is not limited to, a local area network (LAN), a wide area network (WAN), a wireless LAN (WLAN), a metropolitan area network (MAN), a personal area network (PAN), cellular network, the Internet, and/or combinations thereof. The computers 101 and 103, and the cloud computing environments 104 and 105 may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The computers 101 and 103 may include a processing unit, a system memory, and a system bus that couples various system components including the system memory to the processing unit. The computers 101 and 103 may include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™ operating system, the Apache™ operating system, an OpenStep™ operating system, iOS™ operating system, Android™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool.

The computers 101 and 103 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, Ruby, Clojure, and/or JavaScript for example. Further, it is not necessary that a single type of instruction or programming language be utilized in conjunction with the operation of the system and method of the invention. Rather, any number of different programming languages may be utilized as is necessary or desirable.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computers 101 and 103 through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

The plurality of cloud computing environments 104, 105 may provide shared computing resources, software and information to the computer 103 and computing arbitrage server 101 on an as-needed basis. For instance, a cloud computing environment 101 may be used to process large amounts of data for a computer 103 which does not have the appropriate computing capacity for the task. In this example the cloud computing environment 104 provides computer infrastructure services for the computer 103.

In one embodiment, the cloud computer environments 104 and 105 use a static pricing model. In another embodiment, the cloud computer environments 104 and 105 use a dynamic pricing model.

In implementations of the present invention, the computing arbitrage server 101 may execute processes for arbitraging computer resources in a cloud computing environment. More specifically, and as described in further detail herein, the computing arbitrage server 101 collects historical pricing and processing data produced from a cloud computing environment to calculate optimal bid pricing and processing times.

Figure 2:
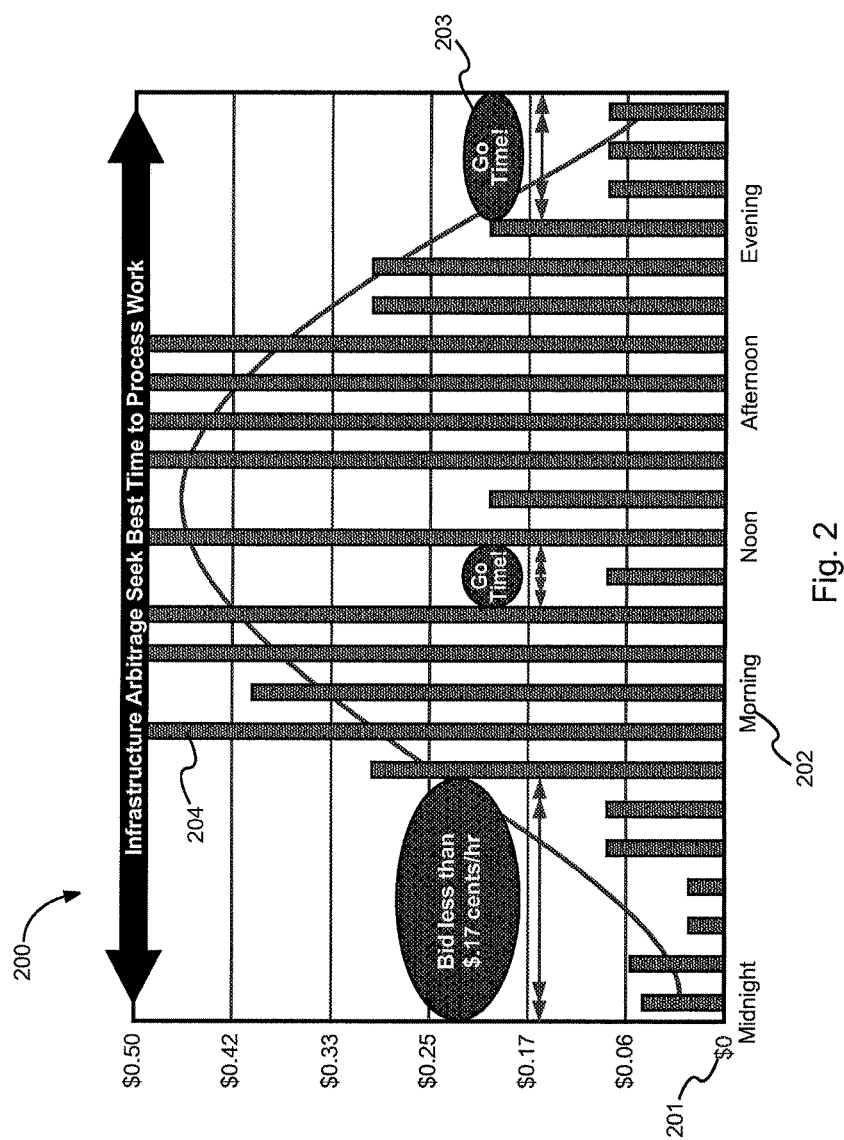
FIG. 2 is a chart illustrating a historical pricing curve in accordance with an illustrative embodiment of the present invention.

FIG. 2 illustrates a historical pricing curve 200 in accordance with an illustrative embodiment of the present invention. Cloud infrastructure services are typically priced and billed on a utility computing basis. The amount of resources consumed and pricing will reflect the level of activity within the cloud computing environment. The pricing curve 200 charts the available computing capacity of a cloud environment over a period of time 202 (x-axis) and the price associated 201 (y-axis) with using the capacity. For instance, during the morning time period the capacity utilization for the cloud computing environment is at the maximum with a maximum price associated of $0.50 204. In order to maximize the most economical and efficient use of computing resources, processing time periods 204 are determined that lay outside the high use (and therefore high cost) times.

In one embodiment, the historical price information is published by the suppliers of the computing resources. In another embodiment, the historical price information is observed and stored by the computing arbitrage server 101. In a third embodiment, the historical price information is a combination of the published price histories and the observed price histories.

Figure 3:
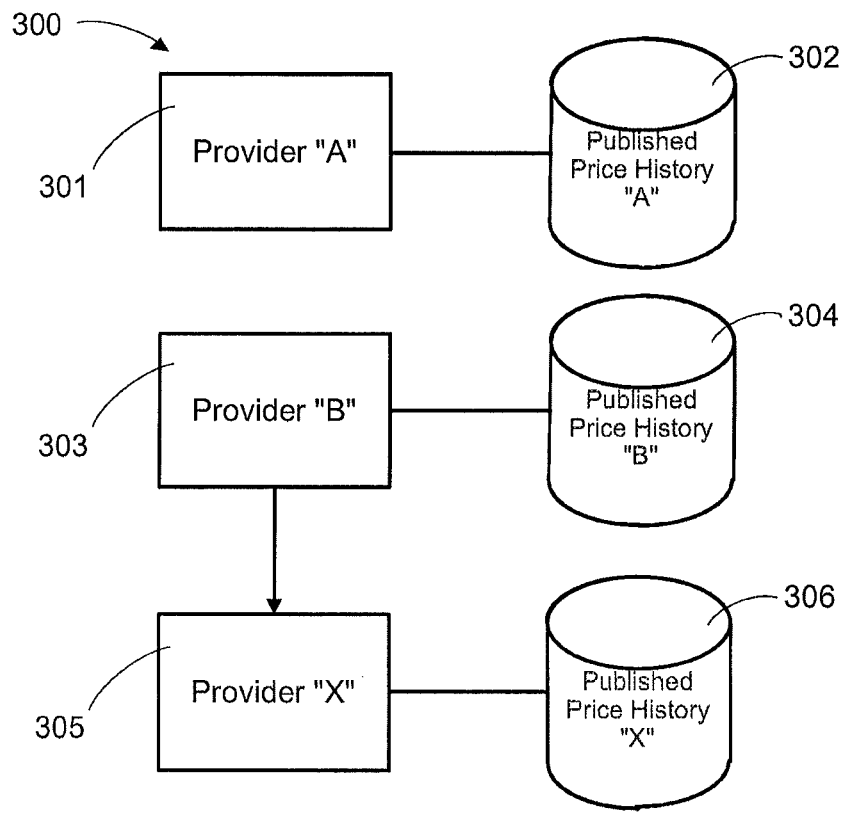
FIG. 3 is a block diagram illustrating providers that publish price history in accordance with an illustrative embodiment of the present invention.

FIG. 3 illustrates providers 301, 303 and 305 that publish price histories 302, 304, and 306 in accordance with an illustrative embodiment of the present invention. A provider 301, 303, 305 is a supplier of computing resources (e.g., a data center), typically a 'compute cycle processing hour'. Some providers 301, 303, 305 make available a history of pricing information detailing compute pricing information 302, 304, 306. This information includes but is not limited to price per CPU hour, time of day price is available, and duration the price per hour is offered.

Figure 4:
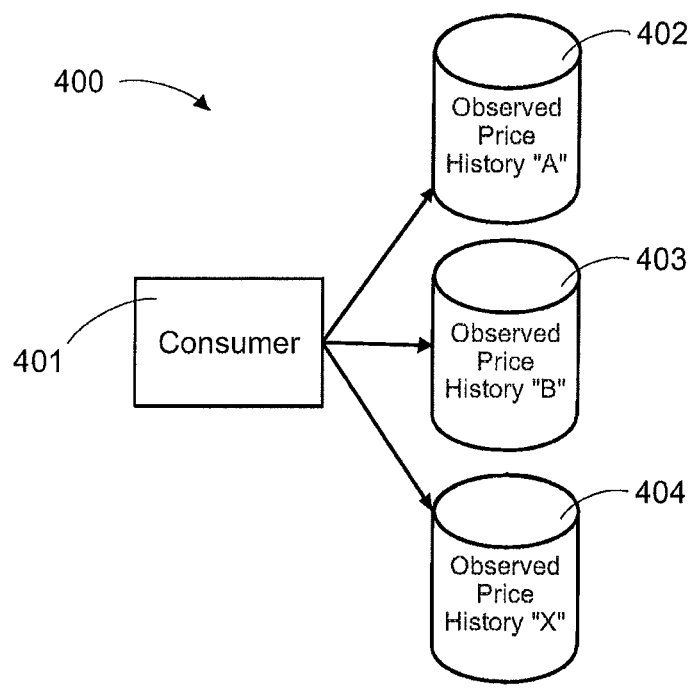
FIG. 4 is a block diagram illustrating a consumer observing price history in accordance with an illustrative embodiment of the present invention.

FIG. 4 illustrates a system 400 that includes a consumer 401, and a consumer observed price history 402, 403 and 404 to process a workload in accordance with an illustrative embodiment of the present invention. A consumer 401 is an entity purchasing compute processing from a provider. The consumer 401 is associated with a price history 402, 403, 404 for each provider. The published price history 302, 304, 306 and observed price history 402, 403, 404 are used to make buying decisions regarding compute processing.

A workload is a defined amount of work (i.e., a task to be executed by the compute processing services of a provider) to be processed by a computer provider for the consumer. A workload has a typical time (e.g. duration) associated with it. The terms "job" and "workload" are synonymous in this embodiment.

Figure 5:
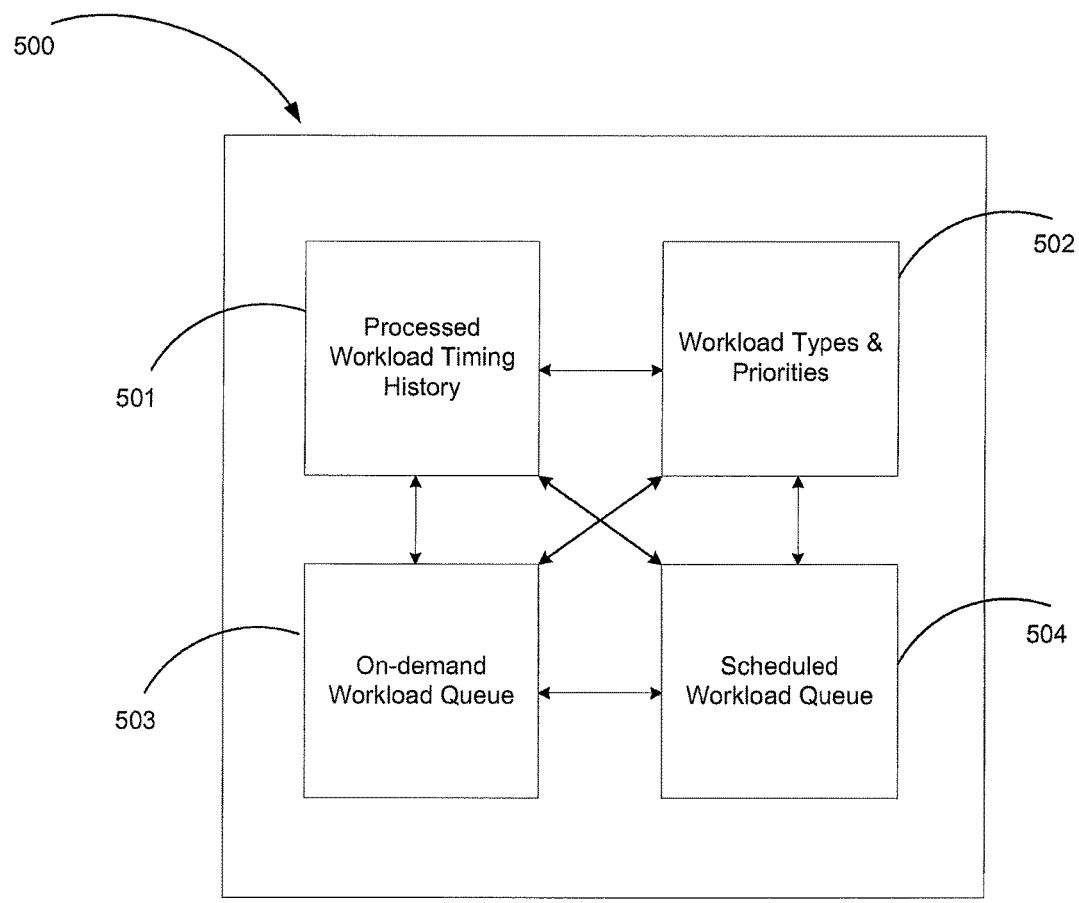
FIG. 5 is a block diagram illustrating a system for processing consumer workloads in accordance with an illustrative embodiment of the present invention.

FIG. 5 illustrates a system for processing consumer workloads 500 in accordance with an illustrative embodiment of the present invention. The system for processing consumer workloads 500 comprises a processed workload timing history module 501, a workload types and priorities module 502, an on-demand workload queue 503 and a scheduled workload queue 504. The processed workload timing history module 501 maintains a database of all previous jobs that includes information not limited to the type of job, the duration of the job, and cross-references the information with the provider history. The workload types and priorities module 502 categorizes workload tasks and assigns a priority level and typical duration. The priority level and duration are variables used by a scheduler in a purchasing calculation in accordance with an embodiment of the present invention. An on-demand workload queue module 503 is a list of tasks that are not previously scheduled. This is a list of "ad-hoc" work to be performed. A scheduled workload queue module 504 is a list of previously scheduled tasks.

Figure 6:
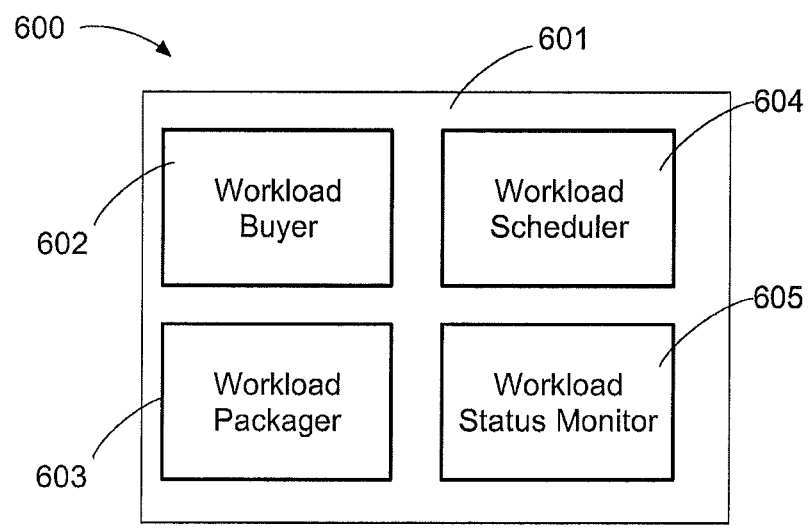
FIG. 6 is a block diagram illustrating the modules of a workload arbitrage engine optimizer in accordance with an illustrative embodiment of the present invention.

FIG. 6 illustrates the modules of a workload arbitrage engine optimizer 600 in accordance with an illustrative embodiment of the present invention. The workload arbitrage engine optimizer (WAEO) 601 comprises a workload buyer module 602, a workload packager module 604, a workload scheduler 604, and a workload status monitor module 605. These modules might be instantiated by one or more computer processes running on a single computer or across a distributed platform. Specific embodiments will be described further below.

The workload arbitrage engine and optimizer 601 is a collection of modules that manages duties including but not limited to the purchase of compute processing units 602, packaging jobs by optimized duration/price/priority levels 603, executing jobs 604 at a provider 301, 303, 305, monitoring job progress, restarting jobs, and moving jobs 605 to another provider 301, 303, 305. The goal of the workload arbitrage engine and optimizer 601 is to seek the lowest compute processing price per workload. The workload packager module 603 breaks up larger tasks therefore optimizing the duration (i.e. expected time to completion) with the provider pricing history duration for jobs of similar types. For example, assume a workload will take two hours to process. Computing resource Provider 301 consistently charges $0.45 for every second of processing time due to very consistent demand. Computing resources Provider 302 is subject to more variable demand and typically charges $0.30 for every second of processing time for the first half hour at 2 AM, 4 AM 10 AM and 11 PM. In this example, the workload packager module 603 determines from the published pricing histories that the optimal price will be achieved by breaking the workload into four tasks, each 30 minutes in processing time.

In one embodiment, the workload arbitrage engine and optimizer 601 takes into account observed price histories 402, 403 and 404. The observed price histories 402, 403 and 404 include information that provides a historical record of past workloads processed for the consumer 401. Each consumer 401 may have an unlimited number of observed price histories. In one embodiment, observed price histories 402, 403, and 404 are each associated with a different Provider 301, 303 and 305. In another embodiment, observed price histories 402, 403, and 404 are each associated with a different data type (e-mail data, document data, billing data, cell phone data, etc.). In yet another embodiment, observed price histories 402, 403, and 404 are each associated with standard amounts of data. While observed pricing histories 402, 403, and 404 are illustrated in FIG. 4 as three different storage devices, the observed pricing histories could be stored on a single storage device, in one or more databases, and indexed according to attributes such as the provider, data type, or amount of data. One of ordinary skill in the art would understand that these three attributes are not the only attributes according to which an observed pricing history could be stored or indexed.

In one embodiment, the particular consumer requesting access to Providers 301, 303, and 305 does not have an associated price history. This might be the case if the consumer is a new consumer and would not have any observed price history. In this embodiment, the workload arbitrage engine and optimizer 601 may match a profile of the new consumer to a profile of a consumer that has an associated observed price history. The workload arbitrage engine and optimizer 601 may select the existing profile based on attributes of the new customer that the workload arbitrage engine and optimizer 601 collects from the new consumer via an interface (e.g., web form). The attributes may consist of as little as the type of business operations of the new customer (e.g., wireless services provider), or it may be very detailed, including the size of the new consumer's business operations, number of customers, number of employees, the size of its enterprise operations, types of data in a typical workload, amount of data in a typical workload, etc. The collected attributes are matched to an existing profile, and therefore, existing observed price histories associated with that existing profile. In one embodiment, the observed price histories associated with the existing profile become the initial observed price histories of the new customer. As the new customer processes workloads using the present system, the initial observed price histories are modified according to the new consumer's processing results. One of ordinary skill in the art would understand that any attributes may be gathered from the new consumer that will help the workload arbitrage engine and optimizer 601 select an existing profile that closely matches the new consumer.

Once the workload arbitrage engine and optimizer 601 has loaded the published price history for the various providers and loaded the observed price history (if one is available), workload arbitrage engine and optimizer 601 may proceed to determine the optimal sizes and distributions to achieve the lowest compute processing price per workload.

In one embodiment, the workload arbitrage engine and optimizer 601 determines the average price per workload based on the observed price history. For example, assume a consumer's typical workload is to index 1,000,000 documents. From the observed price history it is apparent that the historical processing time average has been 30,000 documents indexed per minute. The historical compute provider pricing average for this workload has been $0.60 per minute at standard immediate processing rates. So, the expected expense is (1,000,000/30,000)×$0.60=$19.98.

This is a very simple example. In a more complicated example, the workload arbitrage engine and optimizer 601 will load published pricing histories 302, 304 and 305, for providers 301, 303, and 305, respectively. The published pricing histories have historical pricing data that show, for example, that the cost per compute minute varies throughout the day for each provider 301, 303, and 305. For example, for provider 301, the cost per compute minute may vary from $0.20 to $0.84, for provider 301, the cost per compute minute may vary from $0.30 to $0.90, and for provider 303, the cost per computer minute may vary from $.0.15 to $0.98. Because the price per compute minute varies at each provider and across all three providers, there is an opportunity to optimize the compute processing price per workload by breaking up the workload and distributing it among the three providers. The workload arbitrage engine and optimizer 601 iteratively churns through each use case until it optimizes the number of tasks, the size (e.g., the duration to process) of each task, and an assigned time (by day, hour, minute and/or second) to process each task at the three providers. In one embodiment, the workload arbitrage engine and optimizer 601 can optimize to such a fine granularity that it will determine when to stop processing a task at one provider, repackage it, and move the repackaged task to a different provider. The workload status monitor 605 monitors the processing status of the tasks, stops the task, and moves the task to a different provider of computing resources. The workload status monitor 605 may rely on an optimization plan or schedule created at the end of the optimization process described, above, to determine when to stop, start, and move tasks for processing.

Once the compute processing price per workload is optimized the system presents the expected processing price and duration to the user via an interface. The user, via the same or a different interface, either accepts or declines the processing at the proposed price and duration. The user can also tell the system to automatically select the bid without approvals—"automatic mode."

If the user accepts the proposed processing price and duration, the workload scheduler module 604 uses the job priority and provider pricing history to schedule the current workload queues as a continuous process. The workload buyer module 602 purchases and initiates jobs with a provider 301, 303, 305. The workload status monitor module 605 checks the status of current running tasks in order to look for jobs that could be stopped at a provider 301, 303, 305. In addition, the workload status monitor module 605 moves and restarts jobs from one provider to another 301, 303, 305.

Figure 7:
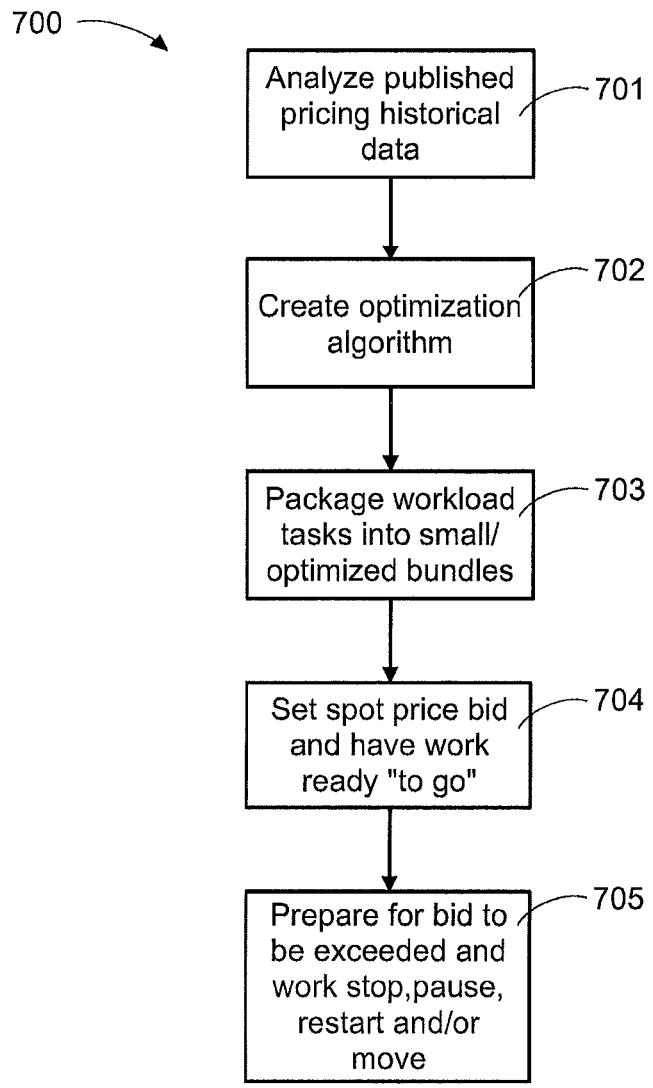
FIG. 7 is a block diagram illustrating the steps of a workload arbitrage optimization method in accordance with an illustrative embodiment of the present invention.

FIG. 7 illustrates the steps of a workload arbitrage optimization method 700 in accordance with an illustrative embodiment of the present invention. The first step is to analyze published pricing historical data to establish a pricing curve 701. Next, an optimization algorithm is created that finds the best workload processing times according to the pricing curve 702. Workload tasks are packaged into small and optimized work bundles 703. The spot price is set and the work is ready "to go" 704. The final step prepares for a bid to be exceeded and work to stop, pause, restart, and/or move based on the outcome of the bid process 705.

In another embodiment, a consumer submits a bid price and a proposed duration. The option to submit a bid price and a proposed duration may be presented to the consumer in the form of two slide bars on a user interface. The consumer manipulates the sliding scales to a particular bid price and duration, for example, $10 per workload and 9 hours. In real-time, the arbitrage engine and optimizer 601 determines all of the optimized processing price per workload given the consumer's particular constraints, and presents via the same or another interface the probability that the consumer's workload will be processed within the proposed duration and for the bid price. Typically, when the consumer increases the bid price and proposed duration, the probability increases that the workload will be processed within the set constrains. The probability is determine according to the function:

$$P(A) = \frac{n(A)}{n(S)} \qquad \text{Equation 1}$$

n(A) is occurrences of workloads completing during the designated duration, and n(S) is the sum of the occurrences of workloads completing during the designated duration and the occurrences of workloads failing to complete during the designated duration.

Once the consumer has satisfied their personal threshold for price, duration, and probability of successfully meeting the price and duration, the consumer accepts and the arbitrage engine and optimizer 601 and the workload is processed.

As already stated, the present invention may be implemented in digital electronic circuitry, in computer hardware, firmware, software, or in combinations thereof. The invention may be implemented as a computer program product. A computer program, may be written in any form of programming language, including compiled or interpreted languages, and may be deployed in any form, including as a stand-alone program, as a module, component, subroutine, or other unit suitable for use in a computing environment. A computer program may be deployed or be executed on one computer, on multiple computers at one site, or distributed across multiple sites and interconnected by a communication network.

Method steps of the present invention may be performed by one or more programmable processors executing a computer program product to perform functions of the present invention by operating on input data and generating output data. Method steps may also be performed by, and an apparatus of the present invention may be implemented as, special purpose logic, circuitry, e.g., FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., EPROM, and flash memory devices; magnetic disks such as internal hard disks and removable disks; magneto-optical disks; and CD-ROM and DVD-ROM disks. The processor and the memory may be supplemented by, or incorporated in special purpose logic circuitry.

The present invention may be implemented in a system including, but not limited to the systems described herein, which include: a back-end component, (e.g., a data server), middleware component (e.g., application server) or a front-end component (e.g., a client device having a graphical user interface or a Web browser through which a user may interact with an implementation of the invention), or any combination of such back-end, middleware, or front-end components. The components of the system may be interconnected by any form or medium of digital data communication (e.g., a communication network).

It is understood that the embodiments described herein are merely illustrative of the present invention. Variations in the construction of the method and system for arbitraging computer resources in a cloud computing environment may be contemplated by one skilled in the art without limiting the intended scope of the invention herein disclosed.

What is claimed is:

1. A method executed on or more control data processors to control processing of a data processing workload among a plurality of competing cloud computing resources, the method comprising:

receiving, over a first network connection from a user processor, a specification for the data processing workload consisting of two or more different types of data and consumer constraints that include a bid and a proposed duration;

maintaining, in a storage media, price history information for each of the plurality of competing cloud computing resources, wherein the price history information indicates a price per unit of time that varies over time for each type of data;

maintaining, in the storage media, information concerning occurrences of past workloads successfully completing during a designated duration, and information concerning occurrences of past workloads failing to compete during a designated duration, for each of the plurality of competing cloud computing resources;

utilizing, by one or more of the control data processors, the price history information, the specification for the data processing workload, the bid, and the proposed duration to determine a schedule that comprises (a) a number of tasks the data processing workload should be broken into, wherein the number of tasks being two or more tasks and selected based on the two or more different types of data that make up the workload and the price history information for completing tasks that correspond to the two or more different types of data that make up the workload, wherein the number of the two or more tasks is selected to obtain an optimal compute processing price for processing the data processing workload across selected competing cloud computing resources of the plurality of competing cloud computing resources;

(b) a selected particular one of the competing cloud resources to execute each of said two or more tasks, such that at least two tasks execute on two different particular ones of the cloud computing resources;

(c) a determined duration that each of said two or more tasks should be processed for; and (d) an assigned start time that each of the two or more tasks should begin to be processed at two or more particular cloud computing resources selected from the plurality of competing cloud computing resources;

determining a probability that the data processing workload will be processed within the bid price and the proposed duration of the consumer constraints using the particular cloud computing resources of the plurality of competing cloud computing resources, wherein the probability is based on a determination of all optimized processing prices for the data processing workload across the plurality of competing cloud computing resources given the consumer constraints and a function: $P(A)=(n(A))/(n(S))$ where $n(A)$ depends on the past occurrences of workloads successfully completing for the particular cloud computing resources during the designated duration, and $n(S)$ is a sum of the past occurrences of workloads successfully completing for the particular cloud computing resources during the designated duration and the past occurrences of workloads failing to complete for the particular cloud computing resources during the designated duration;

forwarding, to the user processor over one of the network connections, the price, the proposed duration, and the probability that the workload will be processed within the proposed duration;

receiving, from the user processor, information indicating that execution of the workload should proceed;

assigning each of the two or more tasks, to the two or more particular cloud computing resources according to the schedule, so that each of the two or more tasks is assigned to execute on each of the particular cloud computing resources beginning at the respective assigned start time for the determined duration further comprising:

sending a first task over a network connection, to a first one of the two or more particular cloud computing resources;

monitoring, over a network connection, a processing status of the first task on the first one of the two or more particular cloud computing resources;

stopping execution of the first task on the first one of the particular cloud computing resources; and sending the first task, over a second network connection, to a second one of the particular cloud computing resources, and thereby subsequently continuing execution of the first task on the second one of the particular cloud computing resources.

2. The method of claim 1, further comprising purchasing compute time from the particular cloud computing resource to which each task is sent.

3. The method of claim 1, further comprising selecting a price history for at least one of the cloud computing resources based on a stored profile associated with a user.

4. The method of claim 3, wherein the stored profile is also associated with one of the plurality of competing cloud computing resources.

5. The method of claim 3, wherein the stored profile of the user has associated attributes, the attributes including one or more of: average work load size, average historical processing time, price fluctuations, type of information processed, and combinations thereof.

6. The method of claim 1, further comprising selecting a price history based on a stored profile associated with a second user, the second user being a different user than a first user that requests processing of the workload.

7. The method of claim 6, further comprising:

collecting information related to processing of the workload; and modifying the stored profile of the first or second user based on the collected information.

8. The method of claim 1 additionally wherein the monitoring step further comprises determining that the first one of the particular cloud computing resources has stopped execution of the task before expiration of the determined duration of the first task due to such dynamic demand by another workload.

9. A data processor system for controlling processing of a workload among a plurality of competing cloud computing resources, the system comprising:

an interface, for receiving over a network connection from a user processor, a specification for the workload consisting of two or more different types of data, and consumer constraints that include a bid and a proposed duration;

a memory, for storing price history information for reach of the plurality of competing cloud computing resources, wherein the price history information indicates a price per unit of time that varies over time for each type of data;

the memory for storing information concerning occurrences of past workloads successfully completing during a designated duration, and information concerning occurrences of past workloads failing to compete during a designated duration, for each of the plurality of competing cloud computer resources;

a workload processor that utilizes the price history information for the plurality of competing cloud computer resources in conjunction with the specification for the workload, the bid, and the proposed duration to determine a schedule that comprises:

(a) a number of tasks the workload should be divided into, wherein the number of tasks is greater than two and selected based on the two or more different types of data that make up the workload and the price history information for completing tasks that correspond to the two or more different types of data that make up the workload, wherein the number of the two or more tasks is selected to obtain an optimal compute processing price for processing the data processing workload across selected competing cloud computing resources of the plurality of competing cloud computing resources;

(b) a selected particular one of the competing cloud resources to execute each of said two or more tasks, such that at least two tasks execute on two different particular ones of the cloud computing resources;

(c) a determined duration that each of said two or more tasks should be processed for; and (d) an assigned start time that each of the two or more tasks should begin to be processed at two or more particular cloud computer resources, as selected from the plurality of competing cloud computing resources;

the workload processor further:

determining a probability that the data processing workload will be processed within the bid price and the proposed duration of the consumer constraints and using the particular ones of the plurality of competing cloud computing resources, wherein the probability is based on a determination of all optimized processing prices for the data processing workload across the plurality of competing cloud computing resources given the consumer constraints and a function: $P(A)=n(A))/(n(S))$ where $n(A)$ depends on the past occurrences of workloads successfully completing for the particular cloud computing resources during the designated duration, and $n(S)$ is a sum of the past occurrences of workloads successfully completing for the particular cloud computing resources during the designated duration and the past occurrences of workloads failing to complete for the particular cloud computing resources during the designated duration, forwarding, to the user processor over one of the network connections, the price, the proposed duration, and the probability that the workload will be processed within the proposed duration, and receiving, from the user processor, information indicating that execution of the workload should proceed, queues that maintain each task, of the two or more tasks, wherein each task is to be assigned to execute on a selected one of the two or more particular cloud computing resource at the assigned start time for the determined duration according to the schedule; and a workload monitor that monitors an execution status of a first task at a first one of the particular cloud computing resources, stopping execution of the first task at the first one of the particular cloud computing resources; and continues execution of the first task at a second one of the particular cloud computing resources.

10. The system of claim 9, further comprising a workload buying module that purchases compute time from the particular cloud computing resource for which the task is queued.

11. The system of claim 9, wherein the workload packaging module selects a price history based on a stored profile associated with a user.

12. The system of claim 11, wherein the stored profile is also associated with one of the plurality of competing cloud computing resources.

13. The system of claim 11, wherein the workload packaging module selecting a price history based on a stored profile associated with another user different from the user.

14. The system of claim 13, wherein the workload packaging module collects information related to processing of the workload and modifies the stored profile based on the collected information.

15. The system of claim 11, wherein the stored profile has associated with it attributes, the attributes including one or more of: average work load size, average historical processing time, price fluctuations, type of information processed, and combinations thereof.

16. The system of claim 9 wherein the schedule developed for a workload having an email data type is different from a schedule having a different data type.

17. The system of claim 9 additionally wherein access to the first one of the particular cloud computing resources is made available via a dynamic pricing model and the monitoring determining that the first one of the particular cloud computing resources has stopped execution of the task before expiration of the determined duration of the first task due to such dynamic demand by another workload.

18. A method for managing access by a cloud computing user to multiple competing cloud computing service providers, comprising:
　　receiving pricing information from the multiple competing cloud computing service providers that indicates a price per unit of time and fluctuates with demand for the respective services over time among different service providers;
　　receiving, from the cloud computing user, specification information for a workload, consisting of two or more different types of data, to be processed, wherein the specification information includes consumer constraints that consist of a bid and a proposed duration;
　　scheduling the workload on the multiple cloud computing service providers based on the pricing information and the workload specification by determining
　　(a) a number of tasks the workload is to be broken up into comprising two or more tasks, wherein the number of tasks is selected based on the two or more different types of data that make up the workload and the price history information for completing tasks that correspond to the two or more different types of data that make up the workload,
　　wherein the number of the two or more tasks is selected to obtain an optimal compute processing price for processing the data processing workload across selected competing cloud computing service providers of the multiple competing cloud computing service providers;
　　(b) a selected particular one of the multiple competing cloud computing service providers to execute each of said two or more tasks, such that at least two tasks execute on two different particular ones of the multiple competing cloud computing service providers;
　　(c) a determined duration that each of said tasks should be processed for; and
　　(d) an assigned time each task should begin to be processed at a particular competing cloud computing service provider;
　　determining a probability that the data processing workload will be processed within the bid price and the proposed duration of the consumer constraints using the particular ones of the plurality of competing cloud computing service providers, wherein the probability is based on a determination of all optimized processing prices for the data processing workload across the multiple competing cloud computing service providers given the consumer constraints and a function: $P(A)=(n(A))/(n(S))$ where $n(A)$ depends on the past occurrences of workloads successfully completing for the particular cloud computing service providers during a designated duration, and $n(S)$ is a sum of the past occurrences of workloads successfully completing for the particular cloud computing service providers during the designated duration and the past occurrences of workloads failing to complete for the particular cloud computing service providers during the designated duration;
　　displaying on a display screen of a computing device the price, the proposed duration, and the probability of completing within the proposed duration; and
　　in response to receiving an indication that the price and proposed duration are accepted, sending, over a network connection, each task, of the number of tasks, to a different particular cloud computing service providers so that each task executes on the different particular cloud computing service providers beginning at the assigned time for a determined duration,
　　further comprising:
　　maintaining progress of execution of a first task at a first service provider;
　　stopping processing the first task at the first service provider; and
　　moving and executing the first task to a second service provider.

19. The method of claim 18 wherein a schedule developed for a workload having an email data type is different from a schedule developed for another data type.

* * * * *